United States Patent [19]

Ando

[11] Patent Number: 5,522,084
[45] Date of Patent: May 28, 1996

[54] METHOD AND SYSTEM FOR INVALIDATING INSTRUCTIONS UTILIZING VALIDITY AND WRITE DELAY FLAGS IN PARALLEL PROCESSING APPARATUS

[75] Inventor: Hideki Ando, Hyogo-ken, Japan

[73] Assignee: Mitsubishi Denki Kabushiki Kaisha, Tokyo, Japan

[21] Appl. No.: 310,508

[22] Filed: Sep. 22, 1994

Related U.S. Application Data

[63] Continuation of Ser. No. 777,698, Oct. 17, 1991, abandoned.

[30] Foreign Application Priority Data

Oct. 17, 1990 [JP] Japan .................... 2-279653

[51] Int. Cl.⁶ .................... G06F 9/38; G06F 15/80
[52] U.S. Cl. .................... 395/800; 395/375; 364/231.9; 364/261.3; 364/DIG. 1
[58] Field of Search .................... 395/800, 775, 395/425, 375; 364/131–134

[56] References Cited

U.S. PATENT DOCUMENTS

| | | | |
|---|---|---|---|
| 4,521,851 | 6/1985 | Trubisky et al. | 395/375 |
| 4,924,525 | 7/1990 | Shintani et al. | 395/375 |
| 5,051,940 | 9/1991 | Vassiliadis et al. | 364/736 |
| 5,136,697 | 8/1992 | Johnson | 395/375 |
| 5,185,868 | 2/1993 | Tran | 395/375 |
| 5,197,135 | 3/1993 | Eickemeyer et al. | 395/375 |
| 5,214,763 | 5/1993 | Blaner et al. | 395/375 |

OTHER PUBLICATIONS

Groves et al, "An IBM Second Generation RISC Processor Architecture" Proceedings of the 35th COMPCON, IEEE 1990, pp. 162–170.

S. McGeady, "The i960CA SuperScalar Implementation of the 80960 Architecture", Proceedings of the 35th COMPCON, IEEE 1990, pp. 232–240.

*Primary Examiner*—Alyssa H. Bowler
*Assistant Examiner*—Alpesh M. Shah
*Attorney, Agent, or Firm*—Lowe, Price, LeBlanc & Becker

[57] ABSTRACT

A superscalar-type processor includes an instruction memory, a fetch stage fetching simultaneously a plurality of instructions from the instruction memory, functional units respectively executing predetermined functions, and a decode state decoding the fetched instructions to issue parallel-processable instructions to related functional units. The decode stage includes a decoder determining whether a branch instruction is included in the received instructions and whether a branch is generated according to the branch instruction. The decoder links a write delaying flag indicating whether the instruction is after a branch instruction and a validity flag indicating whether the instruction is valid to the instruction on issuing the instruction to a functional unit. The functional unit includes an execution stage executing an instruction and a write back stage changing a machine state according to the result of execution in the execution stage. The superscalar-type processor comprises a control circuit forbidding changing of the machine state by a write back stage when a branch is generated according to the branch instruction. The control circuit sets the write back stage in a state of delaying changing of the machine state when it is not yet determined whether a branch is generated according to the branch instruction and executes changing of the machine state with the write back stage when it is determined that no branch is generated according to the branch instruction.

26 Claims, 9 Drawing Sheets

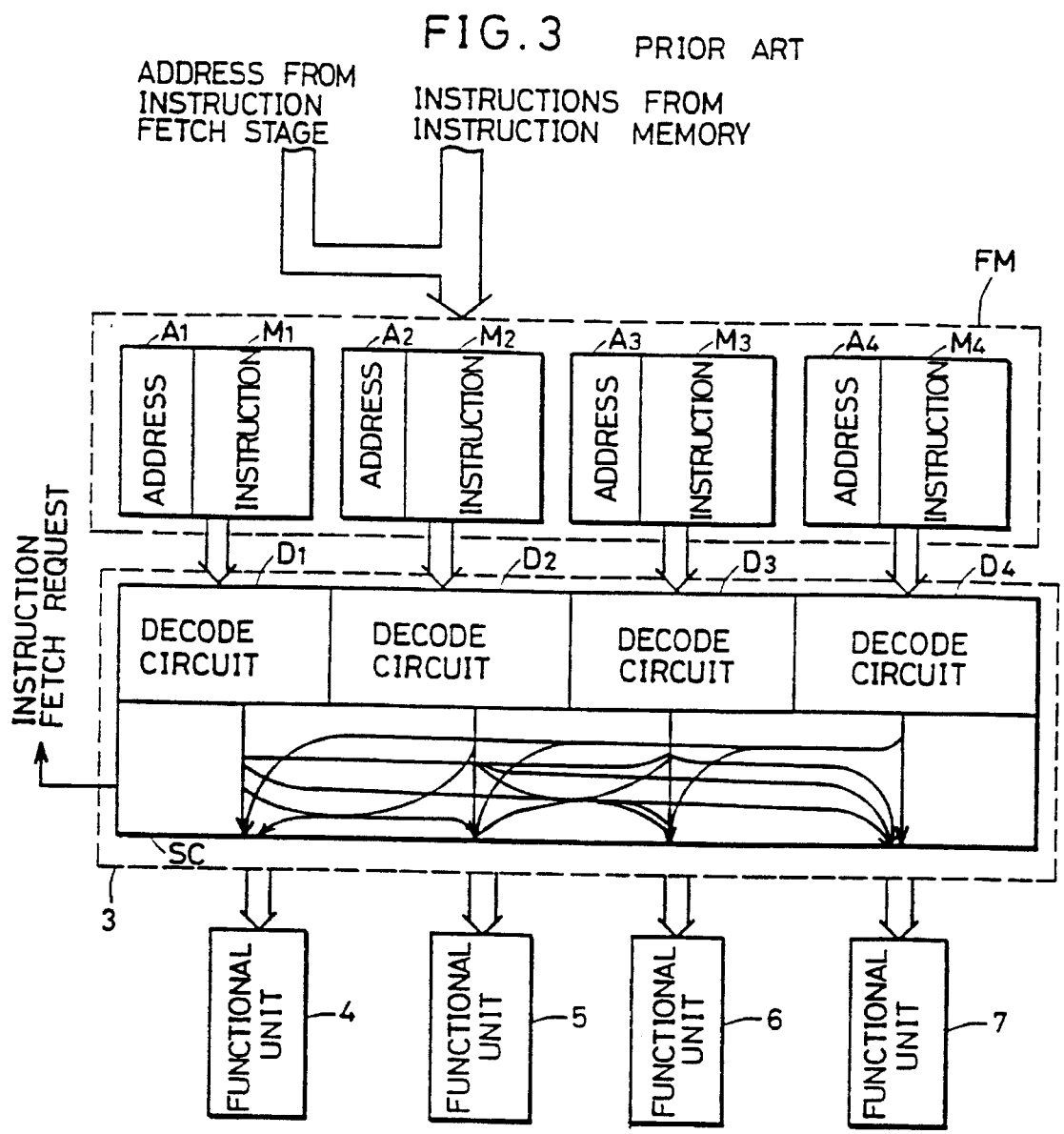

→ TIME

| | | | | | | | |
|---|---|---|---|---|---|---|---|
| ① LOAD R1, 50 (R2) | IF | ID | ADR | MEM | WB | | |
| ② BRZ R1, label | IF | ID | (ID) | (ID) | (ID) | | |
| ③ ADD R4, R5, R6 | IF | ID | (ID) | (ID) | (ID) | EX | WB |
| ④ SUB R7, R8, R9 | IF | ID | (ID) | (ID) | (ID) | EX | WB |
| CYCLE | 0 | 1 | 2 | 3 | 4 | 5 | 6 |

→ TIME

| | | | | | |
|---|---|---|---|---|---|
| ① LOAD R1, 50 (R2) | IF | ID | ADR | MEM | WB |
| ② BRZ R1, label | IF | ID | (ID) | (ID) | (ID) |
| ③ ADD R4, R5, R6 | IF | ID | EX | (WB) | (WB) |
| ④ SUB R7, R8, R9 | IF | ID | EX | (WB) | (WB) |
| CYCLE | 0 | 1 | 2 | 3 | 4 |

FIG.10

LOGIC OF WB_busy_logic

| WB_inst_avail_L | w_RF | WB_delay_inst_L | not_taken | taken | wen | WB_busy | WB_can |
|---|---|---|---|---|---|---|---|
| 0 | x | x | x | x | 0 | 0 | 0 |
| 1 | 0 | x | x | x | 0 | 0 | 0 |
| 1 | 1 | 0 | x | x | 1 | 0 | 0 |
| 1 | 1 | 1 | 0 | 0 | 0 | 1 | 0 |
| 1 | 1 | 1 | 1 | 0 | 1 | 0 | 0 |
| 1 | 1 | 1 | 0 | 1 | 0 | 0 | 1 |

FIG.11

LOGIC OF in_logic1

| WB_can | EX_can | WB_busy | WB_inst_avail |
|---|---|---|---|
| 1 | 0 | x | EX_inst_avail_L |
| 1 | 1 | x | 0 |
| 0 | x | 0 | EX_inst_avail_L |
| 0 | x | 1 | WB_inst_avail_L |

LOGIC OF in_logic 2

| WB_busy | WB_IR | WB_delay_inst | WB_data |
|---|---|---|---|
| 1 | WB_IR_L | WB_delay_inst_L | WB_data_L |
| 0 | EX_IR_L | EX_delay_inst_L | EX_data_L |

ON DETERMINATION OF NON BRANCH
CYCLE 0  1  2  3

(a) WB_inst_avail
(b) WB_delay_inst
(c) WB_busy
(d) WB_can
(e) wen
(f) not_taken LOGIC OF in_logic 3

| WB_busy | EX_IR | EX_delay_inst | EX_inst_avail | tmp 1 (2) |
|---|---|---|---|---|
| 1 | EX_IR_L | EX_delay_inst_L | EX_inst_avail_L | tmp1(2)_L |
| 0 | IR | delay_inst | inst_avail | data 1 (2) |

| EX_can | EX_inst_avail_L |
|---|---|
| 0 | EX_inst_avail |
| 1 | 0 |

METHOD AND SYSTEM FOR INVALIDATING INSTRUCTIONS UTILIZING VALIDITY AND WRITE DELAY FLAGS IN PARALLEL PROCESSING APPARATUS

This application is a continuation of application Ser. No. 07/777,698 filed Oct. 17, 1991, now abandoned.

BACKGROUND OF THE INVENTION

1. Field of the Invention

The present invention relates to parallel processing apparatuses, and particularly to a superscalar-type processor. More particularly, the present invention relates to a control scheme for executing and invalidating instructions which are supplied to pipelines (functional units) after a branch instruction in a superscalar-type processor.

2. Description of the Background Art

In accordance with progress in semiconductor technique in recent years, performance of a microprocessor has become higher, and its operation speed has also become higher. Although the operation speed of a semiconductor memory has also become higher, its speed-up progress can not follow the speed-up progress of a microprocessor, and access to a semiconductor memory has provided a bottleneck in the speed-up of a processor. Therefore, performance of a microprocessor has been enhanced by performing parallel processing. A superscalar is one of the systems for realizing such parallel processing. As illustrated in FIG. 1, a processor of the superscalar type (hereinafter simply referred to as a superscalar) is constructed such that a scheduler (normally provided in an instruction decoder) 200 in the processor detects parallelism in an instruction stream, and supplies instructions which can be processed in parallel to pipelines (functional units) P1, P2, and P3 provided in parallel. It may be said that a superscalar is a computer (or a processor) having the characteristics described in the following.

(1) It simultaneously fetches a plurality of instructions.

(2) It includes a plurality of functional units (pipelines) and is capable of executing simultaneously a plurality of instructions.

(3) It detects instructions which can be simultaneously executed in the fetched plurality of instructions to supply them to corresponding functional units.

FIG. 2 is a diagram illustrating a general structure of a superscalar. Referring to FIG. 2, a superscalar comprises a plurality of functional units 4, 5, 6, and 7 each executing a predetermined function, an instruction fetch (IF) stage 2 fetching simultaneously a plurality of instructions from an instruction memory 1, an instruction decode stage 3 receiving simultaneously the instructions from instruction memory 1 fetched by instruction fetch stage 2 and detecting instructions which can be simultaneously executed to supply the detected instructions to corresponding functional units, and a data memory 8 for storing operational processing results or the like.

Instruction memory 1 generally includes a cache memory and an external main memory and stores instructions necessary for program execution.

Instruction fetch stage 2 provides an instruction pointer IP to instruction memory 1 and fetches simultaneously a plurality of instructions corresponding to the instruction pointer IP from instruction memory 1.

Instruction decode stage 3 includes an instruction decoder, a pipe line sequencer. The instruction decoder receives and decodes the plurality of instructions fetched by instruction fetch stage 2. The pipe line sequencer (an instruction scheduler) identifies the machine types of the decoded plurality of instructions to issue simultaneously instructions of different machine types to corresponding functional units. The machine types indicate in which functional units the instructions should be processed.

Functional units 4–7 are pipelined and execute the received instructions in response to a clock signal. Referring to FIG. 2, four functional units are illustrated as an example, and four instructions at a maximum can be processed in parallel.

Functional units 4 and 5 are integer arithmetic operation units performing integer addition and so on and each includes an execution stage (EX) and a write stage (a machine state changing stage; WB). The write stage (WB) writes the processing result of an instruction executed in the execution stage into a data register (not shown).

Functional unit 6 is a unit executing access (loading or storing data) to data memory 8 and includes an address generating stage (ADR), a stage for executing access to memory (MEM), and a write stage (WB) for writing data into data register (not shown). In the write stage (WB) in functional unit 6, the data loaded from data memory 8 or the data to be stored in data memory 8 are written or read into or from the register.

Functional unit 7 is a unit executing floating point arithmetic operations and includes three execution stages (EX1, EX2, and EX3) and a write stage (WB) for writing execution results into a data register (not shown). A floating point number is a number represented using an exponent and a mantissa without making the position of the decimal point be fixed. A floating point arithmetic operation is an operation using floating point numbers, which enables arithmetic operations of numbers of a wide range in comparison with an integer arithmetic operation, while it requires more cycles for operational processing than an integer arithmetic operation.

In the superscalar, instruction fetch stage 2, instruction decode stage 3, and functional units (4–7) are also pipelined, and these stages operate overlapping with each other. Accordingly, in a case where there is no blank in the pipelines, the data or the instructions processed in a preceding cycle are supplied to respective stages. For example, an instruction decoded by instruction decode stage 3 is the instruction fetched in the preceding cycle.

FIG. 3 is a schematic diagram illustrating the structure of the instruction decode stage. Referring to FIG. 3, instruction decode stage 3 comprises four decode circuits D1–D4 provided in parallel and a pipeline sequencer SC responsive to the decoding results of decode circuits D1–D4 for detecting instructions which can be processed in parallel for issuing the instructions to related functional units.

Decode circuits D1–D4 are provided corresponding to instructions M1–M4 simultaneously fetched from instruction memory 1 to decode corresponding instructions for transmitting the decoding results to the pipeline sequencer SC. The instruction FM supplied to instruction decode stage 3 also includes addresses (logical addresses in instruction memory 1 supplied from the instruction fetch stage) A1–A4 corresponding to respective instructions.

When a branch instruction is included in the fetched instruction FM, the pipeline sequencer SC controls generation of a branch according to the branch instruction, setting of a branch target address in the instruction fetch stage, and supply of instructions subsequent to the branch instruction to functional units. Now, operation will be simply described with reference to FIGS. 2 and 3.

Instruction decode stage 3 supplies an instruction fetch request to instruction fetch stage 2. Instruction fetch stage 2 supplies an instruction pointer IP to instruction memory 1 in response to the instruction fetch request, to fetch a plurality of instructions corresponding to the instruction pointer IP from instruction memory 1. The fetched instructions M1–M4 are simultaneously supplied to the decode circuits D1–D4 included in instruction decode stage 3. The decode circuits D1–D4 decode simultaneously the supplied plurality of instructions.

The pipeline sequencer SC detects instructions which can be processed in parallel not having calculation resources and data registers compete with each other in the instructions decoded in decode circuits D1–D4 and issues the instructions which can be processed in parallel to corresponding functional units.

The functional units to which the instructions are issued execute processing in parallel in accordance with the issued instructions. Functional units 4–7 are pipelined, and processing is executed through each of the execution stages and write stages illustrated in FIG. 2.

Operations of instruction fetch stage 2, instruction decode stage 3, and the instruction executing stage (functional units 4–7) are also pipelined, so that they execute predetermined operations overlapping with each other.

As described above, it is possible to execute instructions at a higher speed by pipelining the operation of each of the stages and the functional units and by executing processing in parallel in a plurality of functional units.

Examples of a superscalar-type processor are shown in (1) S. McGeady, "The i960CA Superscalar Implementation of the 80960 Architecture", Proceedings of 35th COMPCON, IEEE 1990, pp. 232–240 and (2) R. D. Groves et. al., "An IBM second generation RISC Processor Architecture", Proceedings of 35th COMPCON, IEEE, 1990, pp. 166–172.

The prior art (1) discloses a processor having three functional units, REG. MEM, and CTRL, which is capable of executing in parallel three instructions of four instructions simultaneously fetched.

The prior art (2) discloses a processor comprising a fixed-point processor, a floating-point processor, a branch processor, and a control unit, in which four instructions are simultaneously fetched and four instructions can be simultaneously executed.

As described above, in a superscalar, a plurality of instructions are fetched and a plurality of instructions are simultaneously executed, so that it is possible to attain a processing speed higher than in a normal processor.

Referring to the structure illustrated in FIG. 2, in the case where four instructions (M1–M4; see FIG. 3) simultaneously fetched are executed in parallel in four functional units 4–7, for example, it is possible to process and execute four instructions in four clock cycles (in the case where the pipelines of functional units 4, 5, and 6 are in a waiting state until processing by functional unit 7 is completed).

While the instruction scheduler (or the pipeline sequencer SC included in the instruction decode stage) executes scheduling of instructions so that parallel processing is efficiently executed, simultaneously fetched instructions are not always simultaneously processed in functional units.

FIG. 4 is a diagram illustrating an example of issuing of instructions issued from the instruction decode stage. Issuance of instructions from the instruction decode stage will be described in the following with reference to FIG. 4.

First, in a cycle 1, the fetched four instructions are decoded. Instructions 2–4 can not be processed in parallel with an instruction 1, so that only instruction 1 is issued to a functional unit.

Instructions 2 and 3 can be simultaneously processed, while instruction 4 can not be processed in parallel with instruction 2 and/or instruction 3 because of dependent relationship such that it utilizes a processing result of instruction 2 or instruction 3, for example. In a cycle 2, only instruction 2 and instruction 3 are issued.

In a cycle 3, the remaining instruction 4 is issued. In a cycle 4, an instruction 5 and an instruction 6 of four instructions newly fetched are issued as instructions which can be simultaneously processed.

Now, the order of issuing instructions is such that an instruction whose address is smaller is issued with priority in the case where instructions can not be processed in parallel.

There is a case where instructions can not be simultaneously issued even if such a dependent relationship of data does not exist. It is the case where a branch instruction is included in the fetched instructions. An instruction succeeding the branch instruction has its validity determined depending on whether a branch is generated according to the branch instruction, so that it can not be issued until a state is determined according to the branch instruction. Whether a branch is generated according to the branch instruction is determined in the instruction decode stage. Now, the cases are considered where it can not be determined whether a branch is generated in the cycle in which the branch instruction is supplied to the instruction decode stage. The case of a conditional branch instruction is one of such cases. A specific case will be descried in the following.

"The branch instruction is an instruction that "a branch is generated in the case where the content of a register is 0, and no branch is generated in other cases".

However, the register does not have a correct value unless writing according to another preceding instruction is ended."

In such a case, it is necessary that the branch instruction has its execution delayed until writing into the register according to the preceding instruction is ended.

Specific instructions described in the following are considered as such instructions.

(1) load R1, 50 (R2)

(2) brz R1, label (3) add R4, R5, R6

(4) sub R7, R8, R9

The instruction (1) is an instruction that the data of the address of the content of a register R2 with 50 added thereto in data memory 8 is loaded to a register R1.

The instruction (2) is an instruction that a branch to "label" is generated if the content of register R1 is 0.

The instruction (3) is an instruction that the content of a register R6 is added to the content of a register R5, and the result of the addition is written into a register R4.

The instruction (4) is an instruction that the content of a register R9 is subtracted from the content of a register R8, and the result of the operation is written into a register R7.

In the case where such four instructions are provided to the instruction decode stage, the branch instruction "brz" of instruction (2) can not determine whether a branch is generated until data is written into register R1 in accordance with the instruction "load" of instruction (1). Instructions (3) and (4) have their validity determined depending on whether a branch is generated according to the branch instruction "brz" of instruction (2). Specifically, if it is determined that a branch is generated according to instruction (2), instructions (3) and (4) are not to be executed but to be invalidated. On the other hand, if it is determined that no branch is generated according to instruction (2), the instructions (3) and (4) are valid and should be supplied to functional units to be executed. A procedure for issuing instructions which can be considered in this case is illustrated in FIG. 5.

FIG. 5 is a diagram illustrating instruction issuing conditions in the case where a branch instruction is included in the fetched instructions. Description will be given in the following on issuance of instructions in the case where the above-described branch instruction "brz" is included, with reference to FIG. 5.

In a cycle 0, instructions (1)–(4) are fetched to be provided to the instruction decode stage 3.

In a cycle 1, the instructions (1)–(4) are decoded.

In a cycle 2, instruction (1) is issued to a functional unit (functional unit 6 shown in FIG. 2) and executed. Specifically, an address of the content of register R2 with 50 added thereto is generated in cycle 2. At this time, instructions (2)–(4) are not issued to functional units and held in instruction decode stage 3. Referring to FIG. 5, (ID) indicates a held (waiting) state of each instruction in the instruction decode stage.

In a cycle 3, access to data memory 8 is performed in accordance with instruction (1). The content of register R1 is not yet determined at this time, so that instructions (2)–(4) are held in instruction decode stage 3.

In a cycle 4, writing into data register R1 is performed in accordance with instruction (1), and the content of register R1 is determined.

Whether a branch is generated according to instruction (2) is determined in accordance with that data writing, and it is determined that no branch should be generated.

In a cycle 5, instructions (3) and (4) are issued to functional units (4, 5) and executed.

In a cycle 6, the execution results of instructions (3) and (4) are written into the data register.

In the case where the content of data register R1 is determined and it is determined that a branch should be generated in accordance with instruction (2) in cycle 4, instructions (3) and (4) are not issued, these instructions are invalidated, and an operation of fetching a branch target instruction is executed in cycle 5.

In the instruction issuing method as described above, a problem arises that issuance of instructions to functional units is stopped until it is determined whether a branch is generated even in the case where no branch is generated, so that a problem arises that a blank is generated in pipelines, and instructions can not be executed at a high speed.

SUMMARY OF THE INVENTION

An object of the present invention is to provide a parallel processing apparatus capable of executing instructions at a high speed even in the case where a branch instruction is included.

Another object of the present invention is to provide a superscalar-type processor capable of executing instructions at a high speed regardless of a branch instruction.

Still another object of the present invention is to provide a method of executing instructions in which instructions can be executed at a high speed even in the case where a branch instruction is included.

A further object of the present invention is to provide a method of executing instructions in a superscalar-type processor in which instructions can be executed at a high speed even in the case where a branch instruction is included.

A parallel processing apparatus according to the present invention comprises means for adding to an instruction a validity flag indicating whether an instruction is valid or invalid and a write delaying flag indicating whether the instruction is waiting for determination of a branch according to a branch instruction or not and issuing the instruction to a related functional unit, control means for setting operation of a machine state changing stage included in the functional unit in a data holding state, a data invalidating state or a data write executing state in response to the validity flag and the write delaying flag, and means for modifying the values of the validity flag and the write delaying flag in response to a signal detecting generation of a branch according to a branch instruction.

The validity flag indicates whether a related instruction is valid or invalid and whether the instruction should be executed or not. The write delaying flag indicates whether it should be delayed to write the instruction execution result into a data register.

A functional unit includes an instruction executing stage and a machine state changing stage for writing data from the instruction executing stage into the register. In the case where write delaying flag indicates a write delaying state, the functional unit holds the data from the instruction executing stage and delays writing into the register. When the validity flag indicates that the instruction is valid, the instruction executing stage executes an instruction from fetch/decode means. The operation of the machine state changing stage is performed in response to values of the validity flag and the write delaying flag. For an instruction after a branch instruction, data writing into the data register is delayed in accordance with write delaying flag. If the validity flag indicates the instruction is valid, and generation of a branch according to a branch instruction is also detected, the value of write delaying flag is modified to be a value indicating that writing into the register should not be executed. If no branch according to a branch instruction is generated, and it is indicated that the held instruction should be executed, writing of data into the data register is immediately performed.

Accordingly, it is not necessary to delay the issuance of instructions after a branch instruction into a functional unit until it is determined whether a branch is generated according to the branch instruction, and it is possible to process instructions at a high speed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 diagram illustrating a structure of an instruction decode stage in a superscalar.

FIG. 4 is a diagram illustrating issuing conditions of instructions from an instruction decode stage in a superscalar to functional units.

FIG. 10 is a diagram illustrating a logic of "WB_busy_ logic" in FIG. 9 in a table.

FIG. 11 is a diagram illustrating a logic implemented by "in_logic 1" in FIG. 9 in a table.

DESCRIPTION OF THE PREFERRED EMBODIMENTS

First, an instruction issuing and executing sequence in a parallel processing apparatus according to the present invention will be described before description of an embodiment of the present invention.

Figure 1:
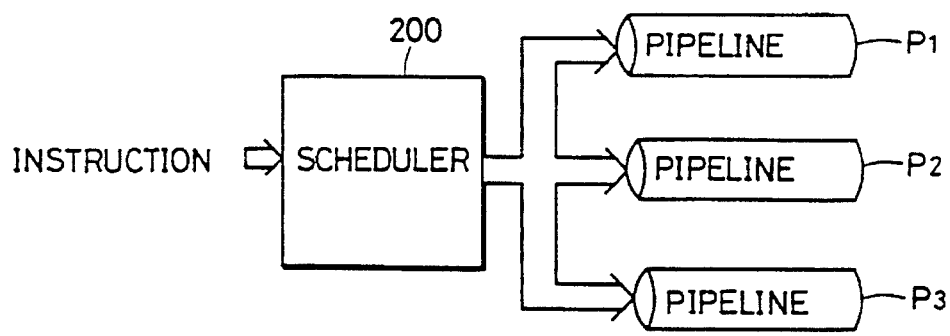
FIG. 1 is a diagram illustrating a conceptual structure of a parallel processing apparatus.
Figure 2:
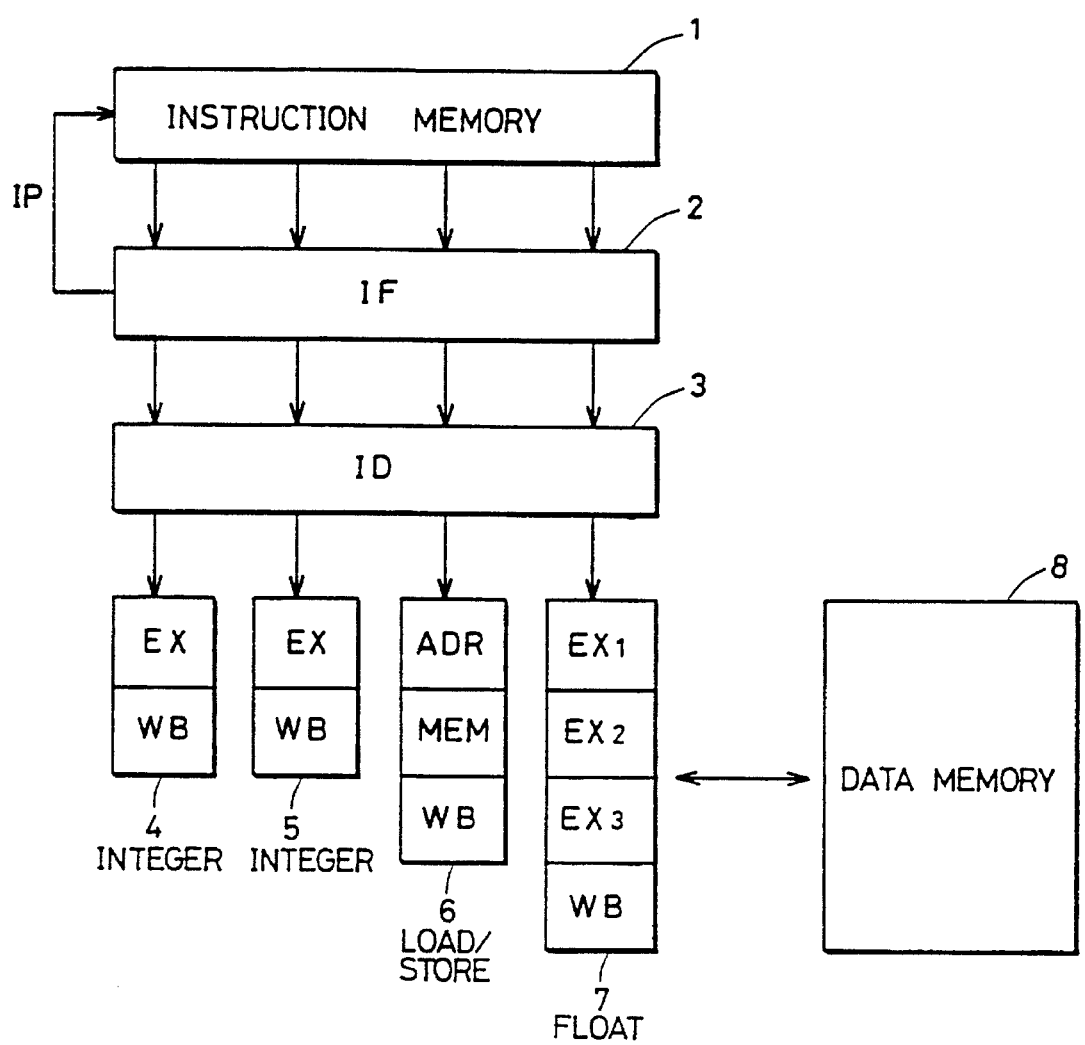
FIG. 2 is a diagram illustrating a general structure of a superscalar.
Figures 5, 6, 8:
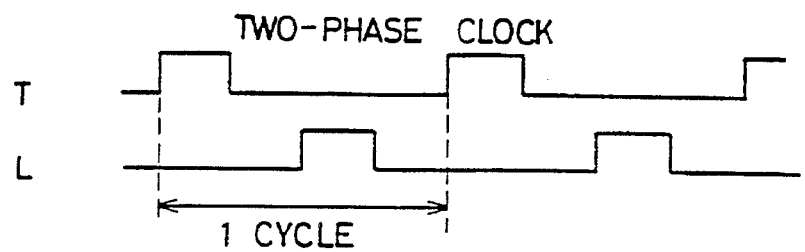
FIG. 5 is a diagram illustrating instruction issuing/executing conditions on generation of a branch in a conventional parallel processing apparatus.
FIG. 6 is a diagram schematically illustrating an instruction executing system according to the present invention.
FIG. 8 is a waveform diagram illustrating a clock signal used by a parallel processing apparatus according to the present invention.

FIG. 6 is a diagram illustrating an instruction issuing and executing sequence in a parallel processing apparatus according to the present invention. The instruction issuing and executing sequence will be described in the following with reference to FIG. 6.

Instructions (1)–(4) illustrated in FIG. 6 are the same as the instructions (1)–(4) illustrated in FIG. 5.

In a cycle 0, instructions (1)–(4) are fetched.

In a cycle 1, the instructions (1)–(4) are decoded in an instruction decode stage.

In a cycle 2, instructions (1), (3), and (4) are issued to functional units. According to instruction (1), an address of a data memory (8) is generated. On the other hand, instructions (3) and (4) are executed in functional units (4) and (5) which are, for example, integer operation units. Instruction (2) is held in an instruction decode stage 3, and it is not yet determined whether a branch should be generated in the instruction decode stage (ID).

In a cycle 3, accessing to a data memory 8 is performed in accordance with instruction (1), and a desired data is read out. On the other hand, the execution results of instructions (3) and (4) are transmitted to a machine state changing stage (WB) to be held therein. At this time, writing of the execution results of instructions (3) and (4) into data registers is not yet performed.

In a cycle 4, the data read from data memory 8 is written into a data register R1 in accordance with instruction (1), and the content of register R1 is determined. It is determined whether a branch should be generated according to instruction (2) in the instruction decode stage in accordance with determination of the content of register R1. In the case where it is determined that no branch is generated, the execution results of instructions (3) and (4) held in the machine state changing stage (WB) are written into registers R4 and R7, respectively, in accordance with determination of non-branch according to instruction (2).

In a cycle 4, in the case where a branch according to instruction (2) is determined, and it is determined that branch to "label" should be made, the data of instructions (3) and (4) held in the machine state changing stage (WB) are invalidated, and the instructions staying in an instruction executing stage EX are also invalidated (it is performed using a validity flag). In the next cycle 5, an instruction of the branch target "label" is fetched on generation of a branch.

Comparison between the instruction issuing/executing sequence illustrated in FIG. 6 and the instruction issuing/executing sequence illustrated in FIG. 5 clearly shows that instructions (3) and (4) are executed two cycles earlier in the instruction issuing/executing sequence according to the present invention, and it enables processing of instructions at a higher speed. The instruction issuing/executing sequence according to the present invention will be summarized as described in the following.

(1) Instructions succeeding a branch instruction are issued to related functional units and executed before it is determined whether a branch is generated according to the branch instruction.

(2) When these succeeding instructions reach a state of rewriting a machine state, the machine state rewriting is stopped and brought to a waiting state.

(3) If it is determined that a branch is generated according to a branch instruction, i.e. in the case where it is determined that a branch should be generated, these succeeding instructions are invalidated. On the other hand, if it is determined that no branch is generated according to the branch instruction, rewriting of the machine state according to these succeeding instructions is allowed.

Rewriting of the machine state indicates changing of the state of a related unit in accordance with execution of instructions such as rewriting of the content of the data register, rewriting of the content of data memory 8, and rewriting of the state flag, for example. Next, a structure for implementing the instruction issuing/executing sequence illustrated in FIG. 6 will be described.

Figure 7:
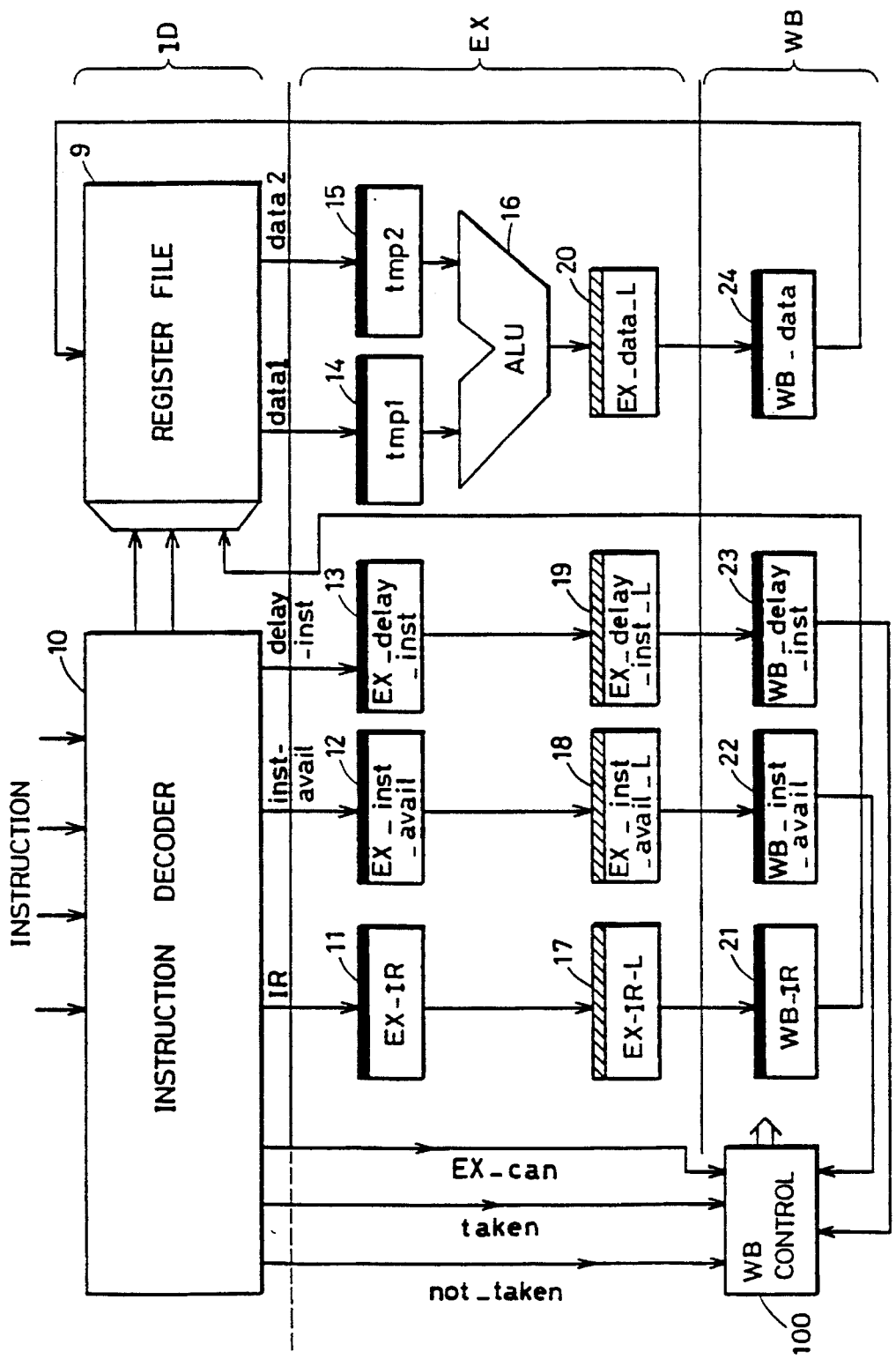
FIG. 7 is a logic diagram schematically illustrating a structure of a functional unit in a parallel processing apparatus according to an embodiment of the present invention.

FIG. 7 is a diagram illustrating a structure of a main part of a parallel processing apparatus according to an embodiment of the present invention, which illustrates a schematic structure of a part of a functional unit (4 or 5) performing integer arithmetic operations.

Referring to FIG. 7, the functional unit (integer arithmetic operation unit) comprises an EX stage performing an arithmetic operation with an arithmetic logical operation unit (ALU) 16 and a WB stage writing the execution result of EX stage into a register file 9. The EX stage is an instruction executing stage in the functional unit and the WB stage is a machine state changing stage in the functional unit.

An instruction decode stage (ID stage) includes an instruction decoder 10 decoding a plurality of instructions fetched from an instruction memory (not shown in FIG. 7). Instruction decoder 10 includes the decode circuit and the pipeline sequencer illustrated in FIG. 3. Instruction decoder 10 decodes received instructions, detects whether a branch instruction is included in these received instructions, and, in the case where a branch instruction is included, detects whether the instructions are after the branch instruction. Detection of whether the instructions are after the branch instruction or not is performed according to the addresses of the instructions supplied to instruction decoder 10, which addresses are linked with the instructions (see FIG. 3).

Instruction decoder 10 issues the decoded instructions to the EX stages of corresponding functional units. At this time, instruction decoder 10 generates a flag inst_avail indicating whether an instruction IR is valid and a flag delay_inst indicating whether the instruction IR is after the branch instruction, together with an instruction IR. The flag inst_avail is a validity flag and the flag delay_inst is a write delaying flag indicating whether machine state changing according to the instruction should be retarded.

Register file 9 includes a plurality of registers, and a predetermined data is stored in each register. The structure in which register file 9 is employed as a data register is used, for example, in reduced instruction set computers (RISC). In a RISC, access to data memory 8 is made only by instructions of loading (load) and storing (store), and all the other processing is performed using register file 9. The structure of register file 9 illustrated in FIG. 7 is of the same structure of that in the RISC.

The parallel processing apparatus illustrated in FIG. 7 operates in response to non-overlapping two-phase clock signals T and L illustrated in FIG. 8. The start of each cycle is defined by clock signal T.

The EX stage includes a T latch circuit 11 for holding an instruction IR from instruction decoder 10 in response to the clock signal T, a T latch circuit 12 for holding a validity flag inst_avail from instruction decoder 10 in response to the clock signal T, a T latch circuit 13 for latching a write delaying flag delay_inst from instruction decoder 10 in response to the clock signal T, and T latch circuits 14 and 15 latching two data, data 1 and data 2, simultaneously read from register file 9, in response to the clock signal T. Register file 9 provided corresponding to integer arithmetic operation units can perform reading of two data and writing of one data in one cycle.

The EX stage further includes L latch circuits 17, 18, and 19 holding instructions and flags held in respective T latch circuits 11–13 in response to the clock signal L, respectively. L latch circuit 17 holds an instruction EX_IR in response to the clock signal L. L latch circuit 18 holds a validity flag EX_inst_avail held in T latch circuit 12 in response to the clock signal L. L latch circuit 19 latches a write delaying flag EX_delay_inst held in T latch circuit 13 in response to the clock signal L. The sign "EX" given to the heads of signals and flags indicates that they have been issued to the execution stage.

The EX stage further includes an L latch circuit 20 holding an output of ALU 16 in response to the clock signal L.

The WB stage includes a T latch circuit 21 holding an instruction of L latch circuit 17 in response to the clock signal T, a T latch circuit 22 holding a validity flag EX_inst_avail_L held in L latch circuit 18 in response to the clock signal T, a T latch circuit 23 holding a write delaying flag EX_delay_inst_L held in L latch circuit 19 in response to the clock signal T, and a T latch circuit 24 holding an arithmetic operation result data EX_data_L held in L latch circuit 20 in response to the clock signal T. A register of register file 9 is selected in accordance with an instruction WB_IR held in T latch circuit 21, and a data WB_data held in T latch circuit 24 is written into the selected register. The sign "WB" given to the heads of instructions, data, and flags held in latch circuits 21, 22, 23, and 24 indicates that they are in a write back stage.

The parallel processing apparatus further comprises a WB control circuit 100 setting the state of the WB stage in any one of a data holding state, a data write executing stage, and a data invalidating state in response to a branch determination indicating signal "taken", a non-branch determination indicating signal not_taken, and an instruction invalidation indicating signal EX_can generated by instruction decoder 10. Now, the instruction issuing/executing sequence of the parallel processing apparatus according to the present invention will be described with reference to FIG. 7.

When instruction decoder 10 issues an instruction IR to a corresponding functional unit, it adds or links a write delaying flag delay_inst and a validity flag inst_avail to the instruction IR. In each functional unit, these flags delay_inst and inst_avail are transmitted through a pipeline (the EX stage and the WB stage; in the case of an integer unit) together with the instruction IR and used for controlling rewiring of the machine state.

The validity flag inst_avail is a flag indicating whether an instruction issued from instruction decoder 10 is a valid instruction which should be executed. For example, in the case where an instruction fetch request is generated to the instruction memory and no instruction is supplied from the instruction memory, no valid instruction is supplied to instruction decoder 10, so that no valid instruction is supplied in that cycle. Accordingly, in this case, the validity flag inst_avail is brought in OFF state. The identification of the state is performed by observing a ready signal IR_ready delivered from the instruction memory on instruction supply. When the validity flag inst_avail is in ON state, it indicates that the instruction is valid, and it is executed in a functional unit. The validity flag inst_avail added to the instruction IR issued from instruction decoder 10 to a functional unit is made ON. The flags delay_inst and inst_avail are controlled in each stage as described in the followings.

(1) The instruction decode stage (ID stage):

(a) A plurality of instructions supplied to the instruction decode stage ID are decoded in instruction decoder 10. In the case where a branch instruction is included in the supplied instructions, and it is not possible to determine whether a branch should be generated according to the branch instruction in that cycle, instruction decoder 10 brings the write delaying flags delay_inst of instructions after the branch instruction issued to functional units to ON state and issues them together with validity flags inst_avail brought to ON state and the instructions IR until it is determined whether a branch is generated.

(b) In the case where there is no instruction waiting for determination of whether a branch is generated in the instructions supplied to instruction decoder 10, it is not necessary to delay writing of instruction execution results. In this case, the write delaying flags delay_inst are made off and issued with the instructions IR.

(c) In the case where a branch instruction is included and it is determined that a branch is generated according to it, it is not necessary to execute instructions after the branch instruction, so that the validity flags inst_avail are made off. Then, the instructions IR are not issued to functional units. The delaying flags delay_inst are also brought to OFF state.

The instructions IR and the flags delay_inst and inst_avail are transmitted to the WB stages through the EX stages of functional units. The following control is performed in the WB stages.

(2) The WB stage in which rewriting (changing) of the machine state occurs:

(a) In the case where an instruction WB_IR is an instruction performing rewriting of the machine state and the write delaying flag delay_inst is on, the instruction WB_IR is in a state of waiting for determination of whether a branch is generated, and changing of the machine state must not be performed. Therefore, execution of rewriting of the machine state is suspended and is retarded until determination of whether a branch is generated.

(b) In the case where it is determined that a branch is generated according to a branch instruction, a branch indicating signal "taken" and a signal EX_can for invalidating an instruction staying in the EX stage are generated from instruction decoder 10. The WB control circuit 100 sets the validity flag WB_inst_avail of an instruction WB_IR having the flags WB_delay_inst and WB_inst_avail both made on in OFF state. This causes the instruction WB_IR in the WB stage to be invalidated, and changing of the machine state by the instruction WB_IR (writing of data into register file 9 in the structure illustrated in FIG. 7) is inhibited. This causes instructions issued to functional units after the branch instruction to be invalidated.

(c) In the case where it is determined that no branch is generated according to the branch instruction, a non-branch detecting signal not_taken is generated from instruction decoder 10. Then, WB control circuit 100 sets the write delaying flag WB_delay_inst in OFF state. This causes changing of the machine state according to the instruction WB_IR, which has been in a suspended state for providing against the case where a branch is generated, to be immediately executed. Now, operation will be specifically described with reference to FIG. 7.

Instructions fetched from the instruction memory are decoded in instruction decoder 10. In the case where a decoding result is an integer arithmetic operation instruction, two register designating signals (register pointers) are generated to register file 9 from instruction decoder 10, and two data data 1 and data 2, which are data to be arithmetically operated, are read therefrom.

Instruction decoder 10 issues an instruction IR of the decoding result, a validity flag inst_avail in ON state indicating that the instruction IR is valid, and a write delaying flag delay_inst. The write delaying flag delay_inst is set in accordance with whether the instruction IR is an instruction after a branch instruction and whether it can be determined whether a branch is generated according to the branch instruction in this cycle. In the case of a state of waiting for determination of whether a branch is generated according to the branch instruction, the write delaying flag delay_inst is brought to ON (binary "1") state. In the case where no branch instruction is included or in the case where it is determined that a branch is generated according to the branch instruction, the write delaying flag delay_inst is set in OFF (binary "0") state. In the case where it is determined that a branch is generated according to the branch instruction in this cycle, and the instruction IR is not necessary, the validity flag inst_avail is brought to OFF state.

An output of instruction decoder 10 and an output of register file 9 are held in T latch circuits 11–15 in response to the clock signal T. Data tmp 1 and tmp 2 (corresponding to data data 1 and data 2) held in T latch circuits 14 and 15 are supplied to ALU 16, and a predetermined prescribed arithmetic operation is performed.

The instructions and the flags held in T latch circuits 11–13 are held in L latch circuits 17–19, respectively, in response to the clock signal L. An output of ALU 16 is held in L latch circuit 20 in response to the clock signal L. This provides completion of operation in the EX stage.

In the case where no instruction stays in the WB stage, the instructions, flags, and data held in L latch circuits 17–20 are held in T latch circuits 21–24 in response to the clock signal T. In the case where an instruction (i.e. an instruction in waiting for determination of whether a branch is generated) stays in the WB stage, the EX stage keeps holding the instructions, the flags, and the data under the control of WB control circuit 100.

In the case where the flag WB_delay_inst held in L latch circuit 23 is in ON state in the WB stage, writing of data into register file 9 is brought to a state of retarding machine state changing under the control of WB control circuit 100, and the supplied data are kept held therein.

If it is determined that a branch according to a branch instruction is generated in instruction decoder 10, a branch determination indicating signal "taken" is generated and supplied to WB control circuit 100. WB control circuit 100 brings the write delaying flag WB_delay_inst to OFF state and the validity flag WB_inst_avail to OFF state in response to the signal "taken". This causes the instruction WB_IR held in T latch circuit 21 to be invalidated and the data WB_data held in T latch circuit 24 to be invalidated, and writing into register file 9 is not performed.

On the other hand, if it is determined that no branch according to the branch instruction is generated in instruction decoder 10, a non-branch determination detecting signal not_taken is generated and supplied to WB control circuit 100. WB control circuit 100 brings the write delaying flag WB_delay_inst held in T latch circuit 23 to OFF state in response to the signal not_taken. Then, selection of a register of register file 9 is performed in accordance with the instruction WB_IR held in T latch circuit 21, and the data WB_data is written into the selected register.

When a branch determination detecting signal "taken" is generated in instruction decoder 10, a signal EX_can for invalidating the instruction EX_IR_L held in the EX stage is simultaneously generated. The validity flag EX_inst_avail_L held in L latch circuit 18 is brought to OFF state under the control of WB control circuit 100 in response to the signal EX_can, and invalidation of the instruction held in the EX stage is performed. Now, description will be given on a structure for realizing the preparation for branch processing and invalidation of instructions on branch determination described above.

Figure 9:
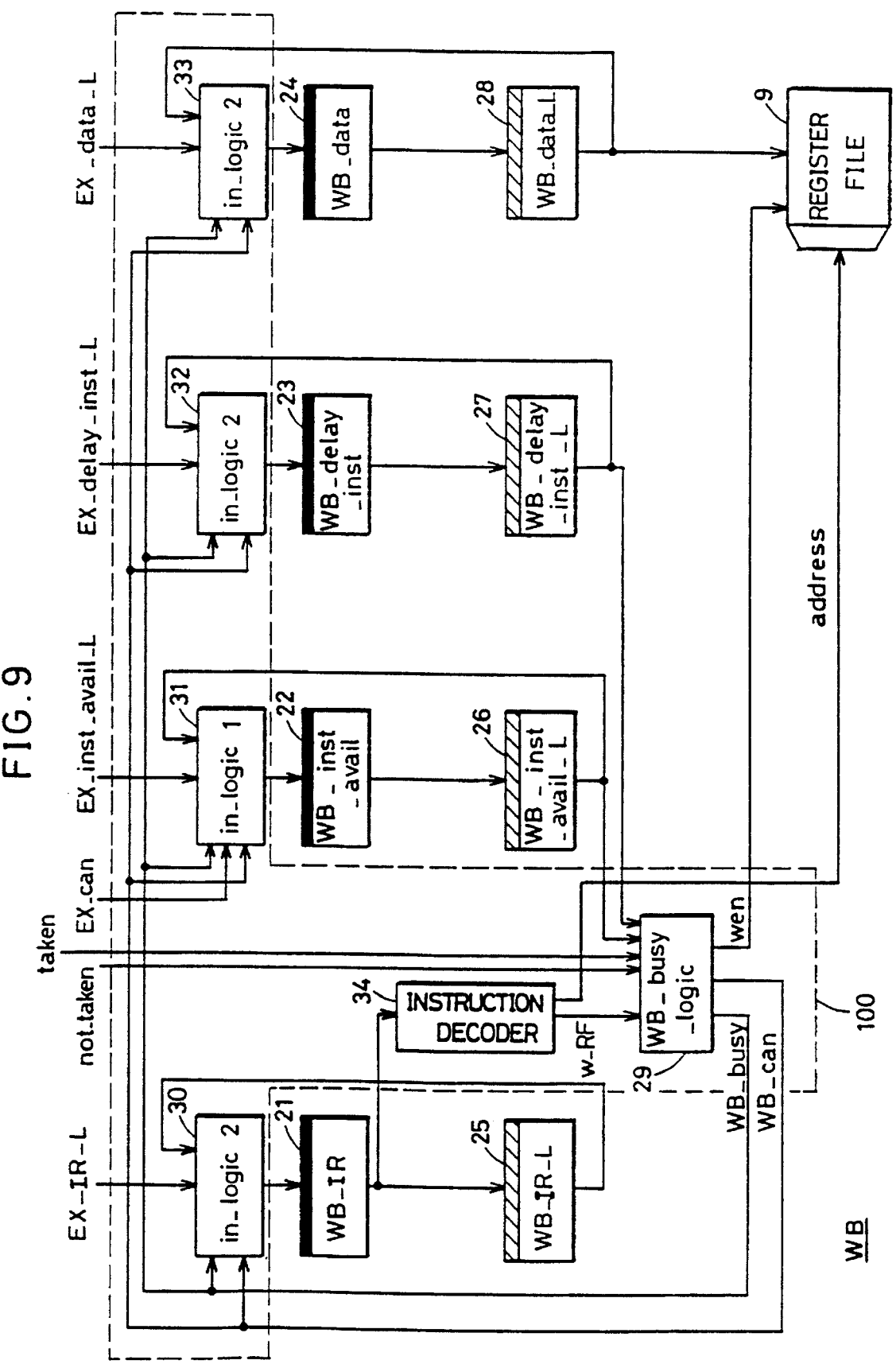
FIG. 9 is a logic diagram schematically illustrating a structure of a register write stage (machine state changing stage) in a parallel processing apparatus according to an embodiment of the present invention.

FIG. 9 is a diagram illustrating an example of a logical structure in the machine state changing stage (WB stage). Referring to FIG. 9, the WB stage comprises a logical circuit 30 provided in the preceding stage of T latch circuit 21, a logical circuit 31 provided in the preceding stage of T latch circuit 22, a logical circuit 32 provided in the preceding stage of T latch circuit 23, and a logical circuit 33 provided in the preceding stage of T latch circuit 24.

Logical circuit 30 selectively passes either an instruction EX_IR_L or an instruction WB_IR_L in response to a signal WB_busy indicating that the WB stage is in machine state change delaying state, i.e. the branch determination waiting state and a signal WB_can indicating that the instruction held in the WB stage is invalidated.

Logical circuit 31 selectively passes either a validity flag EX_inst_avail_L from the EX stage or a validity flag WB_inst_avail_L in the WB stage in response to a signal WB_busy, a signal WB_can, and a signal EX_can indicating that the instruction in the EX stage is invalidated.

Logical circuit 32 passes either a write delaying flag EX_delay_inst_L from the EX stage or a write delaying flag WB_delay_inst_L in the WB stage in response to a signal WB_busy and WB_can.

Logical circuit 33 selectively passes either a data EX_data_L from the EX stage or a data WB_data_L in the WB stage in response to signals WB_busy and WB_can.

The WB stage further comprises an instruction decoder 34 for decoding the instruction WB_IR held in T latch circuit 21 and generating a write indicating signal W_RF indicating whether the data should be written into register file 9 and a register pointer "address" of register file 9, and a logical circuit 29 for monitoring the state of the WB stage to set the WB stage in any one of the data holding state, the data invalidating state, and the data write executing state.

Logical circuit 29 generates signals WB_busy and WB_can and a signal "wen" for setting register file 9 in the write enable state in response to a register file write indicating signal W_RF from instruction decoder 34, a branch determination signal "taken" from instruction decoder 10, a non-branch determination signal not_taken, a validity flag WB_inst_avail_L, and a write delaying flag WB_delay_inst_L.

Logical circuit 31 executes a logic operation indicated by "in_logic 1". Logic circuits 30, 32, and 33 execute a logic operation indicated by "in_logic 2". Logical circuit 29 executes a logic operation indicated by "WB_busy_logic". Now, the logics implemented by respective logical circuits will be described.

FIG. 10 is a diagram showing the logic of WB_busy_logic implemented by logical circuit 29 in a table. The logic of logical circuit 29 will be described in the following.

(1) In the case where there is no valid instruction in the WB stage:

In this condition, the WB stage holds no data to be written, so that it executes no operation. Specifically, in the case where WB_inst_avail_L is off (0), all of the signals "wen", WB_busy, and WB_can are off (0).

(2) In the case where a valid instruction is held in the WB stage:

In this condition, WB_inst_avail_L is in ON (1) state.

(a) In the case where the signal W_RF from instruction decoder 34 is in OFF state, writing of data into the register file is not performed. Such a state is brought about in the case of an instruction simply performing condition determination, for example. Specifically, such a state is brought about in the case where a process is determined on the basis of a certain comparison result, for example, because it is not necessary to write the comparison result into the register.

In this case, writing of data is not performed, and it is possible to fetch a new instruction in the next cycle. Accordingly, in the case where W_RF is off, all of the signals "wen", WB_busy, and WB_can are set to OFF state.

(b) In the case where the signal W_RF is on, and the flag WB_delay_inst_L is off:

In this case, a valid instruction exists in the WB stage, and it is not in the state of waiting for branch determination, so that writing of data may be executed. Accordingly, in the case where W_RF is on, and WB_delay_inst_L is off, the signal "wen" turns on, and the signals WB_busy and WB_can turn off.

(c) In the case where the signal W_RF and the flag WB_delay_inst_L are on:

In this case, it is indicated that an instruction which should execute data writing exists in the WB stage, and the instruction is an instruction after the branch instruction.

(1) In the case where it is not decided whether a branch is generated in the instruction decoder in this state, the WB stage is brought to the state of delaying changing of the machine state. Accordingly, in the case where the signals not_taken and "taken" are both in OFF state, the signals "wen" and WB_can turn off, and the signal WB_busy turns on.

(2) In the case where it is determined that no branch is generated in the state of waiting for branch processing:

In this case, the instruction in the WB stage may be immediately executed. Accordingly, in the case where the signal not_taken is on, and the signal "taken" is off, the signal "wen" turns on, and WB_busy and WB_can both turn off.

(3) In the case where it is determined that a branch is generated in the waiting state:

In this case, the instruction held in the WB stage is invalidated. Writing of data into the register file is not executed, and it is brought to the state of waiting for a valid instruction issued in a later cycle.

Accordingly, in the case where the signal not_taken is off, and the signal "taken" is on, the signals "wen" and WB_busy turn off, and the signal WB_can turns on.

The specific circuit structure implementing the logic of WB_busy_logic shown in FIG. 10 is not shown, since it can be easily implemented based on the table shown in FIG. 10. The logic may be implemented using gate circuits such as an AND gate and an OR gate as well as a PLD (programmable logic device).

FIG. 11 is a diagram showing the logic of in_logic 1 in a table. In_logic 1 is executed by logical circuit 31. The logic of in_logic 1 will be described in the following with reference to FIG. 11.

(1) In the case where WB_can is in ON state:

This state indicates the state in which the instruction of waiting for branch determination is invalidated in the WB stage. Whether the WB stage holds a valid instruction in the next cycle depends on whether the EX stage is invalidated in that cycle. When the signal EX_can is off, the present instruction of the EX stage is supplied to the WB stage in the next cycle. Validity of the instruction is determined according to the flag EX_inst_avail_L. Accordingly, in the case where the EX_can is in OFF state, the flag WB_inst_avail becomes equal to EX_inst_avail_L.

In the case where the flag EX_can is on, it is indicated that the instruction in the EX stage is invalidated. Accordingly, no valid instruction is supplied from the EX stage in the next cycle in the WB stage. Specifically, in the case where EX_can is on, WB_inst_avail turns off.

(2) In the case where WB_can is off:

This state indicates that the operation of invalidating the instruction in the WB stage is not executed.

Figures 12, 13:
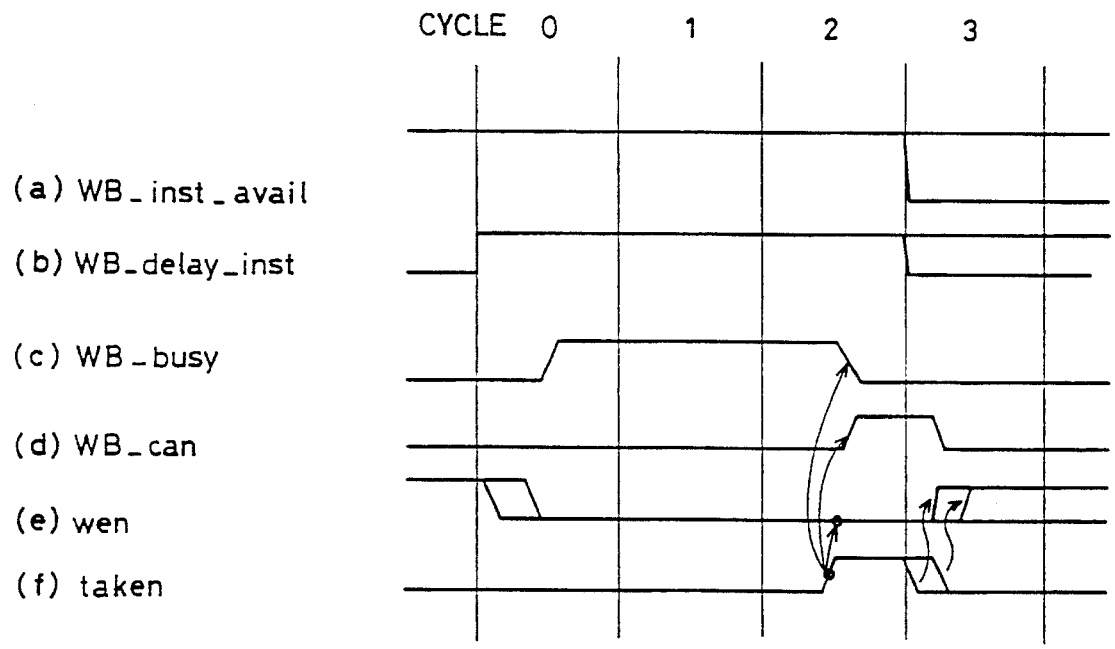
FIG. 12 is a diagram illustrating a logic implemented by "in_logic 2" shown in FIG. 9 in a table.
FIG. 13 is a waveform diagram illustrating an operation of a machine state changing stage in the case where it is determined that a branch is generated in a parallel processing apparatus according to an embodiment of the preset invention.

FIG. 12 is a diagram showing the logic implemented by "in_logic 2". The logic of "in_logic 2" will be described in the following with reference to FIG. 12.

In the case where the signal WB_busy is in OFF state, it is indicated that there is no instruction to be held in the next cycle in the WB stage, and the instruction from the EX stage may be taken into the WB stage. Accordingly, if the signal WB_busy is off, the flag WB_inst_avail becomes equal to the flag EX_inst_avail_L.

In the case where the signal WB_busy is in ON state, it is indicated that the WB stage holds an instruction in the state of waiting for determination of whether a branch is generated. Accordingly, it is necessary to hold the validity flag in this cycle also in the next cycle. Specifically, the flag WB_inst_avail becomes equal to the flag WB_inst_avail_L.

Provision of a logical circuit executing the above-described logical operation in the WB stage makes it possible to write data into the data register at a high speed in the case where it is determined that no branch is generated in the state of waiting for determination of whether a branch is generated according to the branch instruction. The operation will be described in the following with reference to an operation waveform diagram.

FIG. 13 is a signal waveform diagram illustrating the operation of the WB stage in the case where it is determined that a branch is generated in the state of waiting for determination of whether a branch is generated. The operation in the case where it is determined that a branch is generated will be described in the following with respect to FIG. 13.

The cycle 0:

In this cycle, an instruction is supplied to the WB stage, which is an instruction after the branch instruction and should wait for determination of the state of the branch instruction. The write delaying flag WB_delay_inst of the instruction is in ON state. The validity flag WB_inst_avail of the instruction is also in ON state. The states of the outputs WB_delay_inst_L and WB_inst_avail_L of logical circuits 26 and 27 are settled in response to the clock signal L. Responsively, the signal WB_busy from logical circuit 29 is brought to ON state.

A state is assumed here, in which the instruction supplied to the WB stage is an instruction of writing data into register file 9, and a signal W_RF is generated from instruction decoder 34 in response to the clock signal T. Logical circuit 29 does not generate a write enable signal "wen" (sets it to "0"), according to the state of waiting for branch determination, and sets it in data write forbidden state.

Normally, register file 9 is subjected to writing of the data WB_data_L of latch circuit 28 in response to a signal "wen" at the clock signal L. However, the register pointer "address" is settled in response to the clock signal T. Writing of data into register file 9 is in the forbidden state in the cycle 0.

On the other hand, logical circuits 30, 31, 32, and 33 change over their input paths in response to ON state of the signal WB_busy and selects the outputs of corresponding L latch circuits 25, 26, 27, and 28 to transmit them to corresponding T latch circuits 21, 22, 23, and 24, respectively.

The cycle 1:

In this cycle, the signal WB_busy is in ON state, so that the instruction, the flag, and the data supplied to the WB stage in the cycle 0 are held in T latch circuits 21–24 again.

The cycle 2:

In this cycle, it is determined that a branching is generated, and it is determined that the instruction in the WB stage should be invalidated. In this case, the signal "taken" is brought to ON state and supplied to logical circuit 29. This causes generation of a write enable signal "wen" to be forbidden and writing of data into register file 9 to be forbidden. The signal WB_busy is set in OFF state, and the signal WB_can is set in ON state in response to the signal "taken". The WB stage is brought to a state in which an instruction from the EX stage can be received in response to OFF state of the signal WB_busy.

In the case where the instruction held in the EX stage is an instruction after the branch instruction not related to the branch target instruction at this time, a signal EX_can is generated for invalidating the instruction held in the EX stage. Accordingly, the flags WB_inst_avail and WB_delay_inst in the cycle 3 correspond to the flags of the instruction held in the EX stage in the cycle 2.

In the cycle 3, all of the signals WB_busy, "taken", and WB_can are brought to OFF state, and the WB stage processes the instruction received from the EX stage.

The logic "in_logic 2" of logical circuits 30, 32, and 33 also receives the signal WB_can at its input, while the logic is set in accordance with only the signal WB_busy in the above-described logical operation. A structure may be employed in which the signal WB_can is also used for the logical operation. In this structure, the instruction, the flag, and the data in the WB stage are held when the signal WB_busy is on and the signal WB_can is in OFF state, while the instruction, the data, and the flag from the EX stage are passed thereinto regardless of the ON/OFF state of the signal WB_can when the signal WB_busy is off. A circuit configuration for the case where both of the two signals WB_busy and WB_can are used is shown in the drawing.

Although signal EX_can is always generated in the case where the signal "taken" is generated, there is a possible case where it is necessary to invalidate the data held in the EX stage even when no branch is generated. In such a case, the signal EX_can is generated, and invalidation of the instruction in the EX stage is performed. This is also the case for the signal WB_can.

Referring to the signal waveform illustrated in FIG. 13, the timing of rise and fall of the signal "wen" has a certain width, and the timing of fall of the signal "taken" also has a certain width. This indicates that each signal may rise or fall at appropriate timing within this time width. Specifically, the signal "wen" may be enabled at the timing which enables writing of the data WB_data_L in the settled state, and the disable state of the signal "wen" may be settled at a timing at which it is in the settled state before the data write determining state.

While the signal "taken" is generated at a timing of the clock signal L, the timing of fall of it may be set to define the operation of executing fetch processing of a branch target instruction in the next cycle when it is determined that a branch is generated, and it may be held in the settled state at the starting of the cycle 3 in FIG. 13, for example. Now, the operation on determination of non-branch will be described with reference to FIG. 14.

Figures 14, 16, 17:
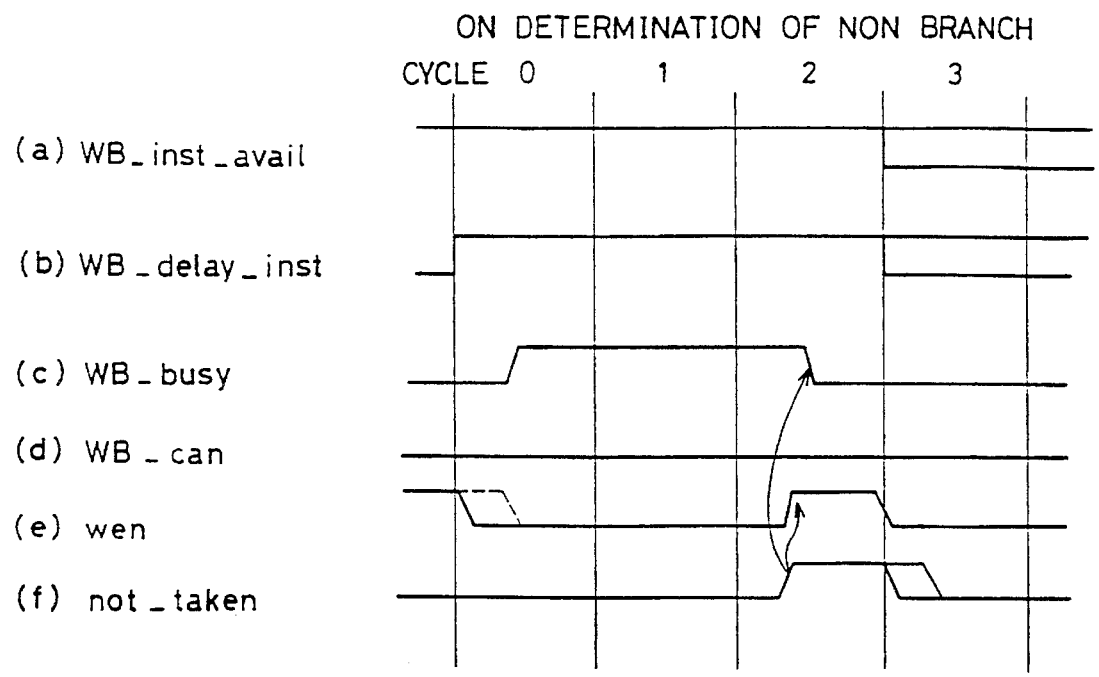
FIG. 14 is a signal waveform diagram illustrating operation of a machine state changing stage in the case where it is determined that no branch is generated according to a branch instruction in a parallel processing apparatus according to an embodiment of the present invention.
FIG. 16 is a diagram illustrating a logic of "in_logic 3" illustrated in FIG. 15 in a table.
FIG. 17 is a diagram illustrating logic operation of L latch circuit for outputting a validity flag illustrated in FIG. 15 in a table.

FIG. 14 is a waveform diagram illustrating the operation in the case where it is determined that no branch is generated in the state of waiting for branch state determination in the WB stage.

The cycle 0 and the cycle 1 are the same as the cycle 0 and the cycle 1 illustrated in FIG. 13. If it is determined that no branch is generated in the cycle 2, the signal not_taken is brought to ON state. Responsively, the write enable signal "wen" is brought to ON state, and data writing into register file 9 is enabled. Register file 9 writes the data WB_data_L from L latch circuit 28 into a register designated by the register pointer "address" from instruction decoder 34 in response to the signal "wen".

At this time, the instruction in the WB stage is executed, and machine state changing is performed, so that the WB stage is brought to the state in which the next instruction from the EX stage can be received. Accordingly, the signal WB_busy is brought to OFF state. The signal WB_can remains in OFF state. This brings each of logical circuits 30–33 to a state passing the output of related L latch circuit in the EX stage.

In the operation in the cycle 3, processing corresponding to the instruction from the EX stage is performed. Specifically, if the instruction supplied from the EX stage is an invalid instruction, no processing is executed, and if it is a valid instruction, processing according to the instruction is executed. The logic and the operation of the EX stage will be described in the following.

Figure 15:
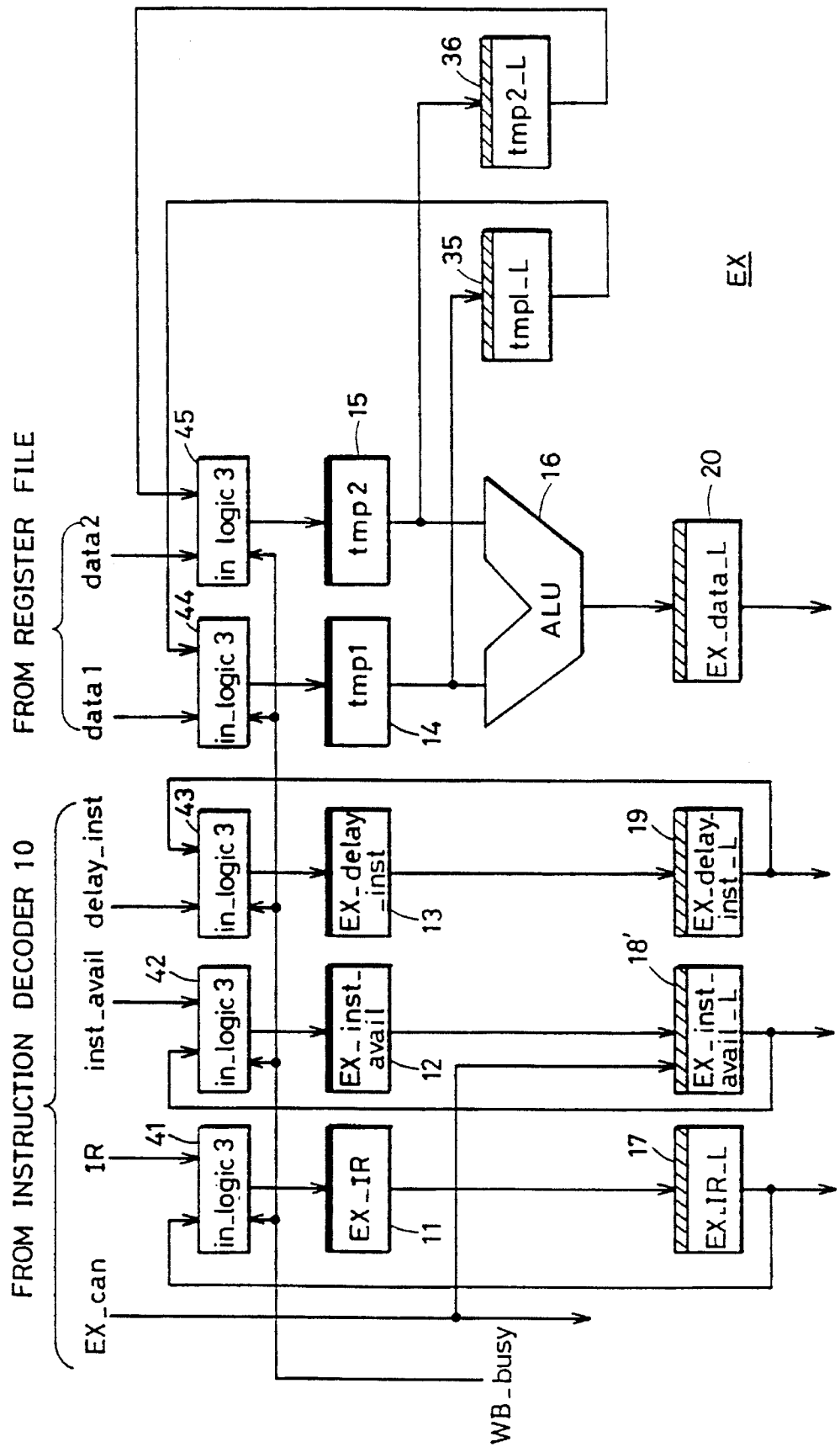
FIG. 15 is a logic diagram schematically illustrating a structure of an execution stage in a functional unit of a parallel processing apparatus according to an embodiment of the present invention.

FIG. 15 is a diagram illustrating the structure of the EX stage. In FIG. 15, the parts corresponding to the parts of the structure illustrated in FIG. 7 are given the same reference numerals.

Referring to FIG. 15, the EX stage comprises logical circuits 41, 42, 43, 44, and 45 provided in the preceding stages of T latch circuits 11, 12, 13, 14, and 15 and L latch circuits 35 and 36 holding the data held in T latch circuits 14 and 15, respectively, in response to the clock signal L.

Logical circuit 41 passes either the instruction IR from instruction decoder 10 in the decode stage ID or the instruction EX_IR_L from L latch circuit 17 in response to the signal WB_busy illustrated in FIG. 9. Logical circuit 42 passes either the validity flag inst_avail from instruction decoder 10 or the validity flag EX_inst_avail_L from L latch circuit 18' in response to the signal WB_busy.

Logical circuit 43 passes either the write delaying flag delay_inst from instruction decoder 10 or the flag EX_delay_inst_L from L latch circuit 19.

Logical circuits 44 and 45 pass either the data data 1 and data 2 read from the register file or the data tmp 1_L and tmp2_L held in L latch circuits 35 and 36, respectively.

L latch circuit 18' has its held data reset and set in OFF state in response to the signal EX_can. The control of the held data of L latch circuit 18' according to the signal EX_can may be implemented by a structure in which a circuit is provided at the input of L latch circuit 18 for setting the output value of the circuit to EX_inst_avail or 0 in response to the signal EX_can if the signal EX_can is in the settled state on generation of the clock signal L.

Logical circuits 41–45 implement the same logic and execute the logic indicated by "in_logic 3".

FIG. 16 is a diagram showing the logic of "in_logic 3" in a table. The logic of "in_logic 3" will be described in the following with reference to FIGS. 15 and 16.

The case where the WB stage is in the instruction holding state provides the state that the EX stage can not supply the instruction to the WB stage and is brought to the instruction holding state. This state is indicated by the signal WB_busy in ON state (binary 1). Accordingly, in the case where the signal WB_busy is on (binary 1), logical circuits 41–45 pass the outputs of corresponding L latch circuits 17, 18', 19, 35, and 36 to corresponding T latch circuits 11–15.

On the other hand, in the case where the signal WB_busy is off (binary 0), the EX stage can supply the held instruction to the WB stage and receive a new instruction from instruction decoder 10. Accordingly, in the case where the signal WB_busy is off, logical circuits 41–45 pass the output of instruction decoder 10 and the output data from register file 9.

FIG. 17 is diagram showing the operation state of L latch circuit 18' in a table. The operation of L latch circuit 18' will be described in the following with reference to FIG. 17. If the signal EX_can is set in ON (binary 1) state, it indicates that the instruction held in the EX stage is invalidated. Accordingly, if the signal EX_can is on, the output flag EX_inst_avail_L of L latch circuit 18' turns off (binary 0).

On the other hand, in the case where the signal EX_can is in OFF (binary 0) state, it indicates that it is not necessary to invalidate the instruction held in the EX stage. In this case, L latch circuit 18' holds the validity flag EX_inst_avail from T latch circuit 12. Specifically, in the case where the signal EX_can is off, the flag EX_inst_avail_L is the validity flag EX_inst_avail in that cycle.

According to the structure described above, it is possible to execute and hold an instruction after the branch instruction in the EX stage in accordance with the instruction processing state of the WB stage. The signal WB_busy may be also supplied to instruction decoder 10 to be used for controlling suspension (delay) of issue of the instruction.

While a structure for performing holding/invalidation of the instruction for an integer unit has been described in the above embodiment, it is possible to attain the same effects in other functional units such as a floating point arithmetic operation unit and a memory access unit by applying the same structure to their machine state changing stages. In addition, the number of the functional units are not limited to four.

As described above, according to the present invention, it is structured such that for an instruction after a branch instruction, a write delaying flag indicating that it is an instruction after the branch instruction is issued to a functional unit together with the instruction, and the machine state changing operation in the functional unit is controlled in accordance with the write delaying flag. Accordingly, even if it is not determined whether a branch is generated according to the branch instruction, it is possible to issue the instruction after the branch instruction to the functional unit, and when it is determined that no branch is generated, it is possible to immediately perform changing of the machine state, so that it is possible to provide a parallel processing apparatus with greatly improved processing speed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A parallel processing apparatus for processing simultaneously a plurality of instructions, comprising:

a plurality of functional units for respectively executing predetermined functions, an instruction memory for storing instructions, fetch means for fetching a plurality of instructions from said instruction memory, decode means for detecting instructions which can be simultaneously processed among the fetched instructions and for supplying those instructions, if any, to related functional units, said decode means including means for detecting whether a branch instruction is included in the fetched plurality of instructions and means for providing a branch generation indicating signal (taken, not_taken) indicating whether a branch is generated according to the branch instruction, each of said functional units including an instruction executing stage for executing an instruction from said decode means and a machine state changing stage for changing a related machine state in accordance with an execution result of the instruction executing stage, means for supplying an instruction to a corresponding functional unit with added thereto a validity flag for indicating validity/invalidity of the instruction supplied to the corresponding functional unit and a write delaying flag for indicating whether the instruction is an instruction after the branch instruction, and control means for setting an operation of said machine state changing stage in either one of (i) a state where a result of execution made by the instruction execution stage is held, (ii) a state where the result of execution made by the instruction executing stage is invalidated, and (iii) a state where the machine state changing stage changes a related machine state in response to said validity flag and said write delaying flag.

2. The parallel processing apparatus of claim 1, wherein said control means includes means for invalidating an instruction in said machine state changing stage in response to an indication that the instruction is after a branch instruction by the write delaying flag added to the instruction in said machine state changing stage and an indication that a branch is generated by said branch generation indicating signal, to forbid changing of a machine state according to the instruction.

3. The parallel processing apparatus of claim 1, wherein said control means includes means for enabling changing of a related machine state according to an instruction in said machine state changing stage, in response to an indication that the instruction is after a branch instruction by the write delaying flag added to the instruction in said machine state changing stage, an indication that no branch is generated by said branch generation indicating signal, and an indication that the instruction is valid by the validity flag added to the instruction.

4. The parallel processing apparatus of claim 1, wherein said control means includes:

means for holding the value of said added write delaying flag, in response to an indication that an instruction is after a branch instruction by the write delaying flag added to instruction in said machine state changing stage and an indication that it is not yet determined whether a branch is generated by said branch generation indicating signal.

5. The parallel processing apparatus of claim 1, wherein said control means includes:

means for holding an instruction and the write delaying flag and the validity flag added to the instruction, in response to an indication that an instruction is after a branch instruction by the write delaying flag added to the instruction in said machine state changing stage and an indication that it is not yet determined whether a branch is generated by said branch generation indicating signal.

6. The parallel processing apparatus of claim 1, wherein said control means includes:

means for forbidding execution of changing of a machine state according to an instruction in said machine state changing stage in response to an indication that the instruction is invalid by the validity flag added to the instruction.

7. The parallel processing apparatus of claim 1, wherein said control means includes:

means for decoding an instruction in said machine state changing stage to generate a machine state change instructing signal in accordance with a result of decoding, means for generating a delay indicating signal for indicating a state of delaying execution of the instruction in said machine state changing stage and an instruction invalidation indicating signal for indicating invalidity of the instruction in said machine state changing stage in response to said machine state changing instructing signal, the validity flag and the write delaying flag added to the instruction in said machine state changing stage, and branch generation indicating information, and means for substituting an instruction and an write delaying flag in said execution stage for the instruction and the write delaying flag in said machine state changing stage in response to said delay indicating signal and said instruction invalidation indicating signal.

8. The parallel processing apparatus of claim 7, wherein said decode means includes means for generating an execution/instruction invalidating signal for invalidating an instruction and an execution result in said execution stage when a branch is generated according to a branch instruction, and said control means includes means for substituting a validity flag added to the instruction in said execution stage for the validity flag in said machine state changing stage in response to said execution/instruction invalidating signal, said delay indicating signal, and said instruction invalidation indicating signal.

9. The parallel processing apparatus of claim 1, wherein said decode means includes means for generating an execution/instruction invalidating signal for invalidating an instruction in said execution stage in response to generation of a branch according to a branch instruction, and wherein said parallel processing apparatus further comprises means for setting a validity flag added to the instruction in said execution stage in a invalid state in response to said execution/instruction invalidating signal.

10. The parallel processing apparatus of claim 1, wherein said control means includes means for generating a delay indicating signal indicating delay of execution of an instruction in said machine state changing stage in accordance with said branch generation indicating signal, the instruction in said machine state changing stage, and the validity flag and the write delaying flag added to the instruction, and said parallel processing apparatus further comprises means for holding an instruction, a validity flag, and a write delaying flag in said execution stage in response to said delay indicating signal.

11. A parallel processing apparatus comprising an instruction memory, a fetch stage for fetching simultaneously a plurality of instructions from said instruction memory, a plurality of functional units for respectively executing predetermined functions, a decode stage for decoding the instructions fetched by said fetch stage to issue an instruction which can be executed to a functional unit, capable of executing said instruction each of said functional units including an execution stage for executing a received instruction and a machine state changing stage for changing a related machine state in accordance with an execution result of the execution stage, said fetch stage, said decode stage, said execution stage, and said machine state changing stage performing a pipeline operation, said apparatus comprising:

decoder means provided in said decode stage for detecting a branch instruction in the instructions fetched by said fetch stage, generating a branch generation indicating signal (taken, not_taken) for indicating whether a branch is generated according to the branch instruction, generating a validity flag for indicating validity or invalidity of the instruction issued to a corresponding functional unit, and generating a write delaying flag for indicating whether an issued instruction is an instruction after said branch instruction, said validity flag and said write delaying flag being linked to said issued instruction and transmitted to said execution stage of the corresponding functional unit, first latch means provided in said execution stage for latching the instruction and said validity flag and write delaying flag received from said decoder means in response to a first clock signal, second latch means provided in said execution stage for latching an output of said first latch means in response to a second clock signal, said second latch means including execution result latch means for latching a result of execution of the predetermined function of said corresponding functional unit, third latch means provided in said machine state changing stage for latching an output of said second latch means in response to said first clock signal, fourth latch means provided in said machine state changing stage for latching an output of said third latch means in response to said second clock signal, write back decode means for decoding an instruction latched in said third latch means, said write back decode means generating a machine state change instructing signal when the decoded instruction indicates change of the machine state, and control means for setting said machine state changing stage in any one of the states of execution changing of the machine state, invalidating the execution, and delaying the execution through selection of any one of the states of executing the instruction decoded by said write back decode means, delaying execution thereof, and invalidating the decoded instruction in response to said machine state change instructing signal, said branch generation indicating signal, and the validity flag and the write delaying flag latched in said fourth latch means.

12. The parallel processing apparatus of claim 11, wherein said control means including:

means for generating a delay indicating signal (WB_busy) indicating delay of execution of changing by said machine state changing stage in response to said machine stage change instructing signal, said branch generation indicating signal, and the validity flag and the write delaying flag latched in said fourth latch means, and means for selectively transmitting either the instruction and the write delaying flag from said second latch means or the instruction and the write delaying flag in said fourth latch means to said third latch means in response to said delay indicating signal.

13. The parallel processing apparatus of claim 12, wherein said decoder means in said decode stage generates an execution canceling signal (Ex_can) indicating canceling of an instruction in said execution stage on generation of a branch according to the branch instruction, and wherein said control means further includes:

means for generating a write back cancel indicating signal (WB_can) for indicating canceling of execution of an instruction in said machine state changing stage in response to said machine state change instructing signal, said branch generation indicating signal, and the validity flag and the write delaying flag latched in said fourth latch means, and means for selectively supplying any one of the validity flag latched in said second latch means, the validity flag latched in said fourth latch means, and an invalidity indicating flag of a predetermined logic level to said third latch means in response to said execution cancel indicating signal, said delay indicating signal, and said write back cancel indicating signal.

14. The parallel processing apparatus of claim 12, further comprising means for selectively passing either an instruction, a validity flag, and a write delaying flag from said decode stage or the instruction, the validity flag, and the write delaying flag latched in said second latch means to said first latch means in response to said delay indicating signal.

15. The parallel processing apparatus of claim 13, further comprising means for setting the validity flag latched in said second latch means to an invalid state in response to said execution canceling signal.

16. A method of invalidating an instruction in a parallel processing unit in which a plurality of instructions are fetched from an instruction memory for processing in parallel thus fetched instructions by a plurality of functional units each performing a predetermined function on a received instruction and including an instruction executing stage (EX) for executing a received instruction and a machine state change stage (WB) for changing the state of a related machine in accordance with an execution result of the instruction executing stage, said method comprising the steps of:

detecting instructions executable in parallel among said thus fetched instructions; and supplying said instructions executable in parallel to a corresponding function unit;

said step of detecting including the steps of detecting whether a branch instruction is included in the thus fetched plurality of instructions and of generating a branch generation indicating signal (taken, not_taken) for indicating whether a branch is generated according to the branch instruction;

said method further comprising the steps of:

supplying a validity flag for indicating validity and invalidity of an instruction supplied to a related functional unit and a write delaying flag for indicating whether the instruction is an instruction after a branch instruction to the related functional unit together with the instruction, and setting the operation of said machine state changing stage in one of
    (i) a state where a result of execution made by the instruction execution stage is held, (ii) a state where the result of execution made by the instruction executing stage is invalidated, and (iii) a state where the machine state changing stage changes a related machine state in response to said validity flag and said write delaying flag.

17. The method of claim 16, wherein said step of setting includes the step of invalidating an instruction in said machine state changing stage and forbidding changing of the machine state according to the instruction in response to an indication that the instruction is after the branch instruction by the write delaying flag added to the instruction in said machine state changing stage and to an indication that a branch is generated by said branch generation indicating signal.

18. The method of claim 16, wherein said step of setting includes the step of enabling changing of the related machine state according to an instruction in said machine state changing stage in response to an indication that the instruction is after the branch instruction by the write delaying flag added to the instruction in said machine state changing stage, an indication that no branch is generated by said branch generation indicating signal, and to an indication that the instruction is valid by the validity flag added to the instruction.

19. The method of claim 16, wherein said step of setting includes the step of holding a value of said write delaying flag in response to an indication that an instruction is after the branch instruction by the write delaying flag added to the instruction in said machine state changing stage and an indication that it is not yet determined whether a branch is generated by said branch generation indicating signal.

20. The method of claim 16, wherein said step of setting includes the step of holding an instruction, a write delaying flag and a validity flag added to the instruction in response to an indication that the instruction is after the branch instruction by the write delaying flag added to the instruction in said machine state changing stage and to an indication that it is not yet determined whether a branch is generated by said branch generation indicating signal.

21. The method of processing of claim 16, wherein said step of setting includes the step of forbidding executing changing of the machine state according to the instruction in response to an indication that the instruction is invalid by the validity flag added to the instruction in said machine state changing stage.

22. The method of processing of claim 16, wherein said step of setting includes the steps of:

decoding an instruction in said machine state changing stage and generating a machine state change instructing signal in accordance with a result of decoding, generating a delay indicating signal for indicating a state of delaying execution of the instruction in said machine state changing stage and an instruction invalidity indicating signal for indicating invalidity of the instruction in said machine state changing stage in response to said machine state change instructing signal, the validity flag and the write delaying flag added to the instruction in said machine state changing stage, and branch generation indicating information, and substituting an instruction and a write delaying flag in said execution stage for the instruction and the write delaying flag in said machine state changing stage in response to said delay indicating signal and said instruction invalidity indicating signal.

23. The method of claim 22, further comprising the step of generating an execution/instruction invalidating signal for invalidating an instruction and an execution result in said execution stage when a branch is generated according to the branch instruction, and wherein said step of setting includes the step of substituting the validity flag added to the instruction in said execution stage for the validity flag in said machine state changing stage in response to said execution/instruction invalidating signal, said delay indicating signal, and said instruction invalidity indicating signal.

24. The method of claim 16, further comprising the steps of:

generating an execution/instruction invalidating signal for invalidating an instruction in said execution stage in response to generation of a branch according to the branch instruction, and setting a validity flag added to an instruction in said execution stage to an invalidity state in response to said execution/instruction invalidating signal.

25. The method of claim 16, further comprising the steps of:

generating a delay indicating signal for indicating delay of execution of an instruction in said machine state changing stage in accordance with said branch generation indicating signal, the instruction in said machine state changing stage, and the validity flag and the write delaying flag added to the instruction, and holding the instruction, the validity flag, and the write delaying flag in said execution stage in response to said delay indicating signal.

26. A parallel processing apparatus comprising:

instruction storage means for storing instructions in a predetermined processing order;

storage means for storing results of executed instructions;

instruction fetching means for fetching from said instruction storage means a plurality of instructions to be processed;

plurality of functional units for processing instructions;

decoder means for simultaneously applying instructions executable in parallel among instructions fetched by said instruction fetching means to corresponding ones of said plurality of functional units;

said plurality of functional units comprising executing means for simultaneously executing predetermined functions in response to simultaneously received instructions, and writing means for writing results of execution of said functional units to said storage means;

delay means responsive to said simultaneously received instructions for delaying said writing means from writing at least one of said results of execution;

validation means responsive to results of execution of another one of said functional units for generating a validation signal (not_taken) indicating that instructions corresponding to the delayed results of execution are valid; and control means responsive to said validation signal for applying a control signal to said writing means to terminate the delay of writing said at least one of said results of execution to said storage means and to enable the writing of said at least one of said results of execution into said storage means, in which said result of another one of said functional units corresponds to a branch instruction, said at least one of said results of execution corresponds to instructions subsequent to said branch instruction in said processing order and said validation signal indicates that a branch by said branch instruction is not taken, said apparatus further comprising:

cancellation signal generating means for generating a cancellation signal (taken) in response to an execution result indicating that said branch is taken; and cancellation means for canceling delayed execution results without writing to said storage means in response to said cancellation signal.

* * * * *